United States Patent [19]

Yamanaka et al.

[11] Patent Number: 4,789,943

[45] Date of Patent: Dec. 6, 1988

[54] THREAD CUTTING CONTROL METHOD

[75] Inventors: Mamoru Yamanaka; Masahiko Sugimura, both of Iruma, Japan

[73] Assignee: Yaskawa Electric Mfg. Co. Ltd., Kitakyushu, Japan

[21] Appl. No.: 921,340

[22] Filed: Oct. 20, 1986

[30] Foreign Application Priority Data

Oct. 21, 1985 [JP] Japan .............................. 60-233503

[51] Int. Cl.⁴ ........................................... G06F 15/46
[52] U.S. Cl. ............................. 364/474.28; 82/2 B; 82/5; 318/571; 408/11; 364/474.33
[58] Field of Search ................... 318/571, 574, 579; 409/31, 75, 76, 77, 65-70; 82/2 B, 1 C, 5; 364/474, 475, 167-171; 408/8-13

[56] References Cited

U.S. PATENT DOCUMENTS

| | | | |
|---|---|---|---|
| 3,949,285 | 4/1976 | Rosshirt | 82/5 |
| 4,034,646 | 7/1977 | Dahlin | 409/76 |
| 4,038,890 | 8/1977 | Winget | 82/5 |
| 4,173,786 | 11/1979 | Kuhnell et al. | 82/2 B |
| 4,253,359 | 3/1981 | Youden | 82/2 B |
| 4,359,676 | 11/1982 | Fujioka | 82/2 B |
| 4,451,892 | 5/1984 | McMurtry | 82/2 B |
| 4,571,687 | 2/1986 | Fukuyama et al. | 82/2 B |
| 4,583,433 | 4/1986 | Nozawa et al. | 82/2 B |
| 4,602,540 | 7/1986 | Murojushi et al. | 82/2 B |

Primary Examiner—Joseph Ruggiero
Attorney, Agent, or Firm—Schmeiser, Morelle & Watts

[57] ABSTRACT

There is provided a thread cutting control method in an NC apparatus having a CPU in an arithmetic unit whereby real time clocks which are generated for every constant time are received as an interruption signal and a sampling operation is performed in response to the interruption signal, thereby controlling the feed system of a machine tool having a thread cutting function. In this system, the rotational speed of a spindle which is rotating asynchronously with the real time clocks is measured; the rotational amount of the spindle from a predetermined position on the rotational position of the spindle until the real time clock is just generated is measured; and after a feed system adapted to perform a thread cutting work on the basis of the rotational amount and the rotational speed has moved by a predetermined distance, a feed command to control the feed system is generated such that the movement distance is constant for the position of the spindle and at the same time, a predetermined ratio is held between the feed speed of the feed system and the rotational speed of the spindle. With this system, the feed shaft to cut the thread lead can be controlled with a high degree of accuracy.

4 Claims, 7 Drawing Sheets

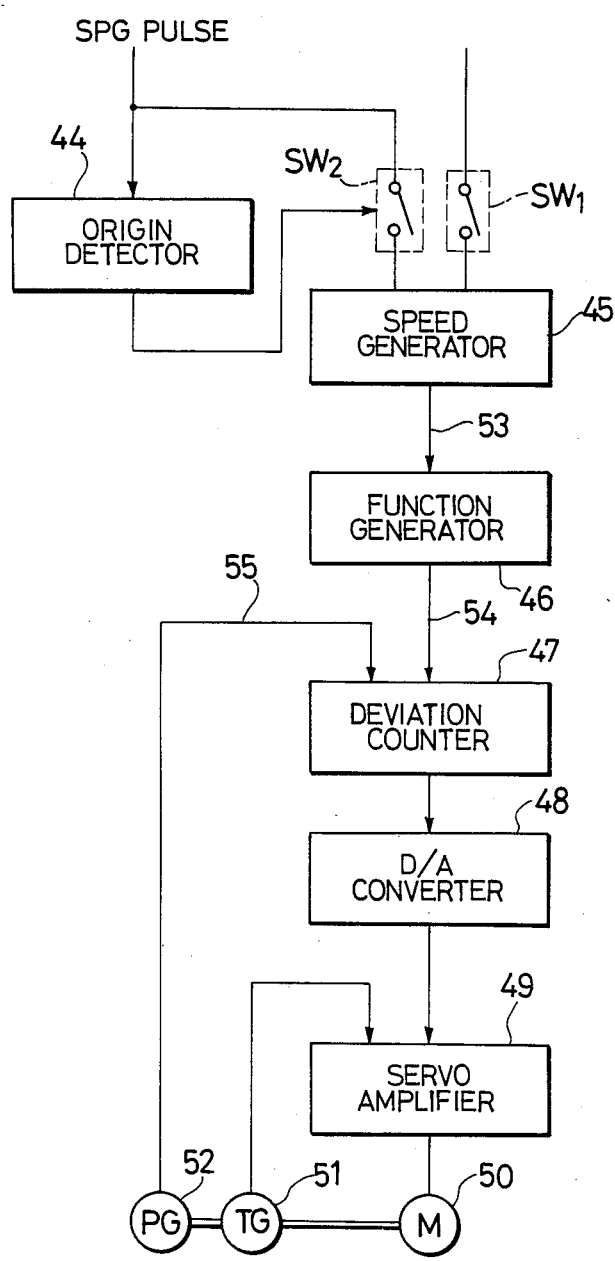

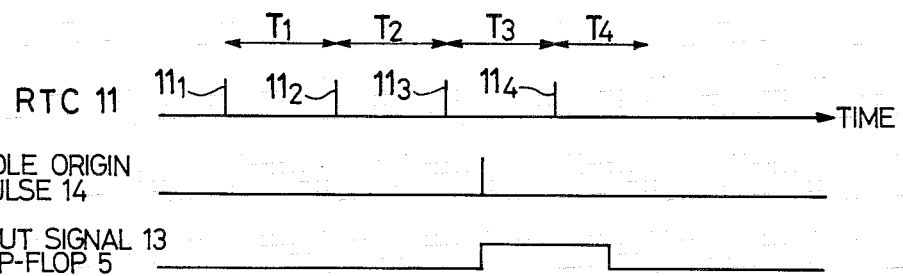
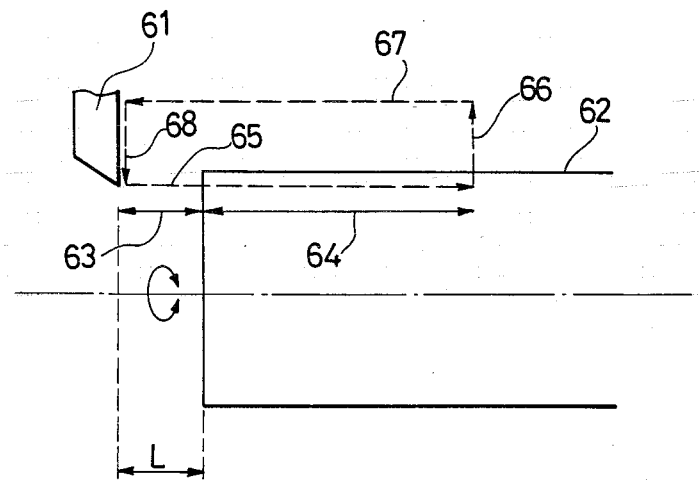

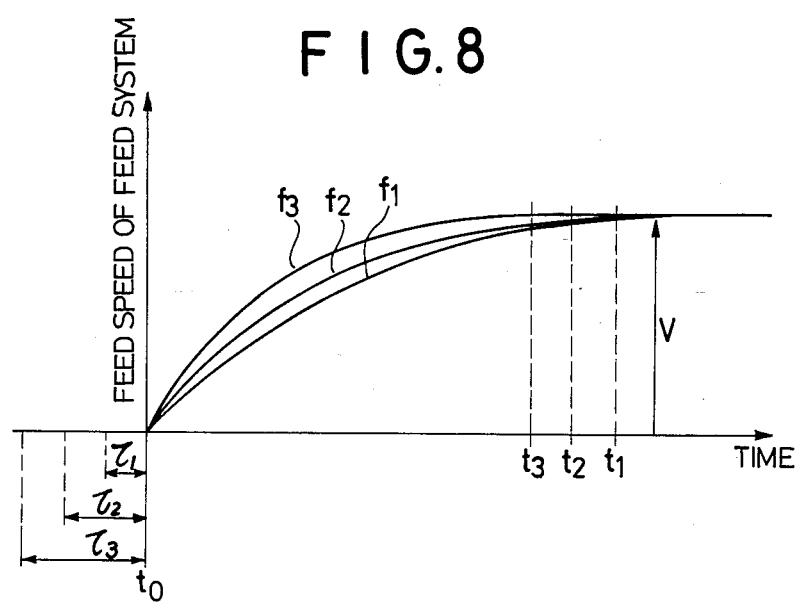
F I G. 8
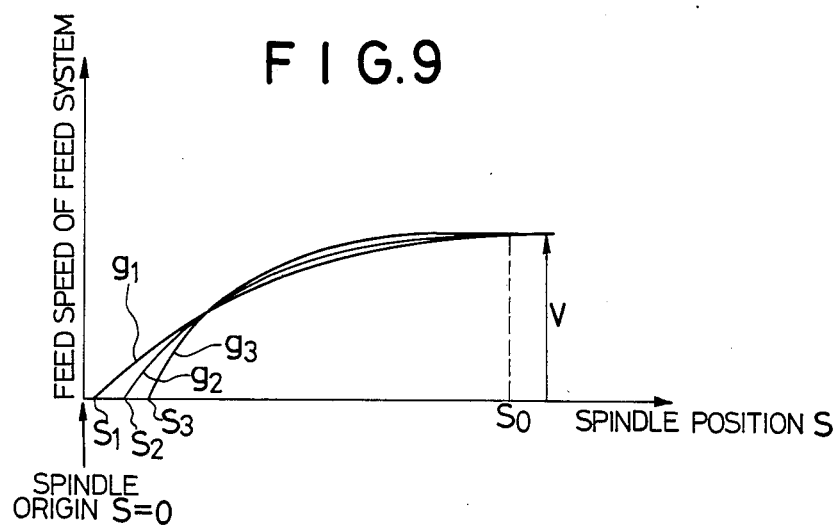
F I G. 9

THREAD CUTTING CONTROL METHOD

FIELD OF THE INVENTION

The present invention relates to an apparatus for controlling thread cutting and, more particularly, to a thread cutting control method in a thread cutting control apparatus which is numerically controlled.

DESCRIPTION OF THE RELATED ART

Thread cutting and thread cutting control in conventional thread cutting control apparatuses will now be described hereinbelow with reference to the drawings.

FIG. 1 is a diagram showing the concept of thread cutting in a conventional lathe.

A cutter 41 adapted to cut a work piece to be worked (hereinafter, simply referred to as a work piece) 42 is controlled as a feed system. In this case, the position and speed of the feed system are controlled by an NC (numerical control) apparatus. The feed system denotes a control system comprising: a motor to move a cutter holder to hold the cutter; a servo amplifier to drive this motor; a pulse generator (hereinafter abbreviated to PG) to detect the rotational position of the motor; a tachogenerator (hereinafter abbreviated to TG) to detect the rotational speed of the motor; a numerical control (NC) apparatus to give a command to the servo amplifier; and other devices. The work piece 42 is rotated by a spindle motor. By feeding the cutter 41 onto the surface of the work piece 42 in the direction indicated by arrow A in FIG. 1, thread cutting is performed. A spindle (main shaft) pulse generator (hereinafter abbreviated to SPG) 43 detects the rotation of the work piece 42 and outputs an origin pulse each time the work piece 42 rotates once. In general, the SPG 43 has a resolution of 4096 pulses per rotation. The feed speed of the cutter holder can be controlled by the NC apparatus on the basis of a feedback (hereinafter abbreviated to FB) pulse from the SPG 43.

Thread cutting means that a thread-like lead is cut in the surface of the work piece 42. However, in thread cutting, there are two significant problems. Thread cutting work is not finished merely by feeding the cutter once but, in general, the same portion of the work piece must be grooved a plurality of times in order to obtain a deep thread groove. Therefore, the first problem is that the thread cutting must be started from the same point of the work piece every time. In other words, the position at which the thread cutting is started must be the position of the origin of the SPG 43 or the fixed position (angle) using the origin as a reference point. The second problem is that, in order to keep the pitch of the thread lead accurate, the feed speed needs to be proportional to the rotational speed of the work piece 42 (actually, the rotational speed of the SPG 43). However, there are problems the that the rotational speed at the first time of the thread cutting work may differ from the rotational speeds at the second and subsequent times and that the rotational speed of the spindle may vary during the thread cutting operation. In other words, the feed speed needs to be controlled in accordance with the rotational speed of the spindle which is variable momently at any given moment.

FIG. 2 is a block diagram showing a conventional example of the control system of a feed system.

In general, in NC machining, there are mainly two kinds of feeding operations: one is a feeding operation which is designated by mm/min and the other is a feeding operation which is designated by mm/rev (feeding operation for the spindle rotation such as in thread cutting and other operations). When the former one (i.e., mm/min) is designated, a switch $SW_1$ is closed, so that a time reference clock is inputted to a speed generator 45. On the other hand, when the latter one (i.e., mm/rev) is designated, a switch $SW_2$ is closed, so that an SPG pulse is inputted to the speed generator 45. The speed generator 45 generates a pulse 53 serving as a reference of the actual speed of the feed shaft by using those inputs as the reference pulses. A function generator 46 generates a command pulse 54 of the feed shaft on the basis of the pulse 53 from the speed generator 45. In general, since two or more axes synchronously operate, the function generator 46 simultaneously generates the command pulses to a plurality of axes. A deviation counter 47 adds the command pulses 54 generated from the function generator 46 and subtracts FB pulses 55 from a PG 52 of the feed shaft from the result of the addition, thereby obtaining the deviation between the instructed position and the current position. A digital-to-analog (D/A) converter 48 converts the digital deviation signal of the deviation counter 47 into the analog signal and outputs it to a servo amplifier 49 as the analog command signal. In response to this command, the servo amplifier 49 drives a motor 50. In this manner, the position control loop is constituted by the deviation counter 47, D/A converter 48, servo amplifier 49, motor 50, and PG 52. The foregoing apparatus also acts as a speed control in a feedback manner on the basis of the detection speed signal from a speed detector or tachogenerator (TG) 51 attached to the motor shaft. However, this speed control is executed to compensate the control system so as to rotate the motor 50 at the speed instructed by the command signal from the D/A converter 48.

According to this method, in order to match the first timing for the thread cutting, the origin pulse of the SPG is detected by an origin detector 44. The switch $SW_2$ is immediately closed just after the origin pulse is detected, thereby starting the generation of the pulse from the speed generator 45. In other words, the driving command to drive the feed system is generated synchronously with the origin of the SPG 52. The synchronization of the driving speed with the spindle is attained by using the reference clock of the speed generator 45 as the SPG pulse. Due to the above methods, the two conventional problems described above are solved.

FIG. 3 is a block diagram showing a conventional example of a software servo system. In this case, the software servo means that the generation of the command to the feed system and the position of the feed system are controlled by a microprocessor by software. The sampling control is performed in the software control. In other words, at every period $T_s$, a data processing unit 56 executes the processes to generate a command, to make a deviation amount of the position, to make data for the D/A converter 48, and other operations. An SPG counter 57 to count the SPG pulses is provided to detect the spindle speed. The spindle speed is sampled as the SPG data. In addition, the position of the feed system is detected by counting the PG pulses by an FB counter 58. The position of the feed system is sampled as the FB data. The D/A converter 48, servo amplifier 49, motor 50, TG 51, and PG 52 are the same as those in the conventional system shown in FIG. 2.

The main difference between the conventional system and the software servo system is as follows: the former system is constituted by hardware in which the pulse unit is used as a fundamental unit, while according to the latter system, the pulses (both of the SPG pulses and the FBPG pulses of the feed shaft) are held in the counters 57 and 58 and sampled as data at a constant period, and the sampled data is operated by software in all of the subsequent processes.

At present, the tendency is that a high machining speed and a high degree of accuracy are required for machine tools. The realization of high accuracy means that, for example, the detection unit is changed from 1 μm to 0.1 μm. However, in this case, there is a limit to realizing high accuracy in the conventional system using the pulse as a fundamental unit. For example, assuming that one pulse is one micrometer and the feed speed F is 24 m/min, the driving speed pps (pulse per second) of the pulse motor will be 400 kpps. In the case of the driving speed of about 400 kpps, the hardware in an NC apparatus can cope sufficiently with this driving speed. However, when one pulse is 0.1 μm and the feed speed F is 24 m/min, the driving speed is 4 Mpps, ten times as fast as in the first case. In the case of such a high driving speed, some parts of the hardware which operate for every pulse cannot cope with this high speed. In the case of the software servo system which processes the pulse as the data, the length of data becomes merely long and it is sufficient to execute the operating process at every predetermined clock (e.g., 1 msec or 2 msec). In other words, the software servo system is fitted for the realization of high driving speed and high accuracy. Further, when considering the development and low prices of microprocessors as well, an NC apparatus which is cheaper and has advanced functions compared with those of the conventional system can be realized by the software servo system.

Although the software servo system has many advantages as described above, it also has a number of following disadvantages. One of them is the problem concerned with the thread cutting.

Since the software servo is based on the sampling control, up to one sampling time is required for the data processing unit to detect the data generated for the sampling period $T_s$. Further, one sampling time is needed to execute the operating process and to output the command to the D/A converter. Thus, a delay of two sampling times occurs. In other words, the generation time point of that data in the sample period of time $T_s$ cannot be detected unless a special hardware is provided.

Therefore, in general, it is difficult to perform the operation to move the feed system simultaneously with the detection of the origin pulse of the SPG as in the case of the thread cutting operation.

SUMMARY OF THE INVENTION

It is an object of the present invention to provide a thread cutting control method in an NC apparatus of the software servo system in which thread cutting work can be performed with a high degree of accuracy.

According to the present invention, the above object is accomplished by a thread cutting control method in an NC apparatus having a CPU in an arithmetic unit whereby real time clocks which are generated for every constant time are received as an interruption signal and a sampling operation is performed in response to the interruption signal, thereby controlling a feed system of a machine tool having a thread cutting function. This thread cutting control method comprises the steps of: measuring the rotational speed of a spindle which is rotating asynchronously with the real time clocks; measuring the rotational amount of the spindle from a predetermined position on the rotational position of the spindle unit the moment the real time clock is generated; and after a feed system adapted to perform a thread cutting work on the basis of the rotational amount and the rotational speed moved by a predetermined distance, generating a feed command to control the feed shaft such that the movement distance is constant for the position of the pindle and at the same time, a predetermined ratio is held between a feed speed of the feed system and the rotational speed of the spindle.

The above and other objects and features of the present invention will become apparent from the following detailed description and the appended claims with reference to the accompanying drawings.

BRIEF DESCRIPTION OF THE DRAWINGS

FIG. 2 is a block diagram of a feed control system in a conventional system;

FIG. 5 is a time chart for real time clocks (RTC) 11, spindle origin pulse, and arithmetic operations of a CPU, respectively;

FIG. 7 is a diagram for explaining the thread cutting operation with an air-cut portion;

FIGS. 8 and 9 are graphs showing the accelerating state in the thread cutting operation in the invention.

DESCRIPTION OF THE PREFERRED EMBODIMENT

An embodiment of the present invention will be described in detail hereinbelow with reference to the drawings.

Figure 1:
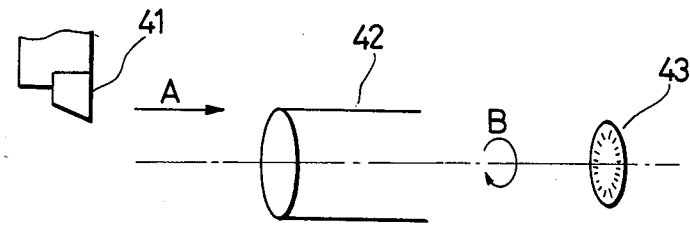
FIG. 1 is a diagram for explaining the concept of thread cutting.
Figure 3:
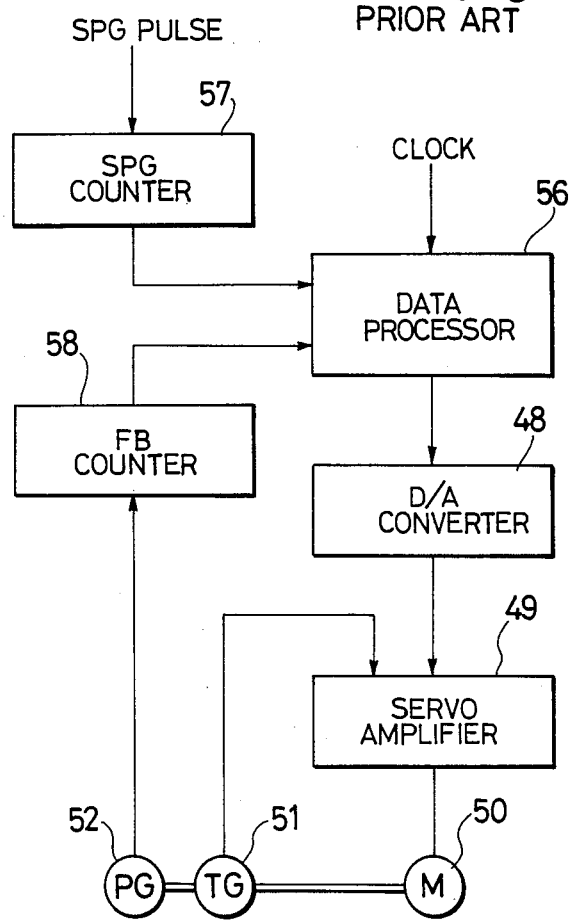
FIG. 3 is a block diagram of a feed control system in a software servo system.
Figure 4:
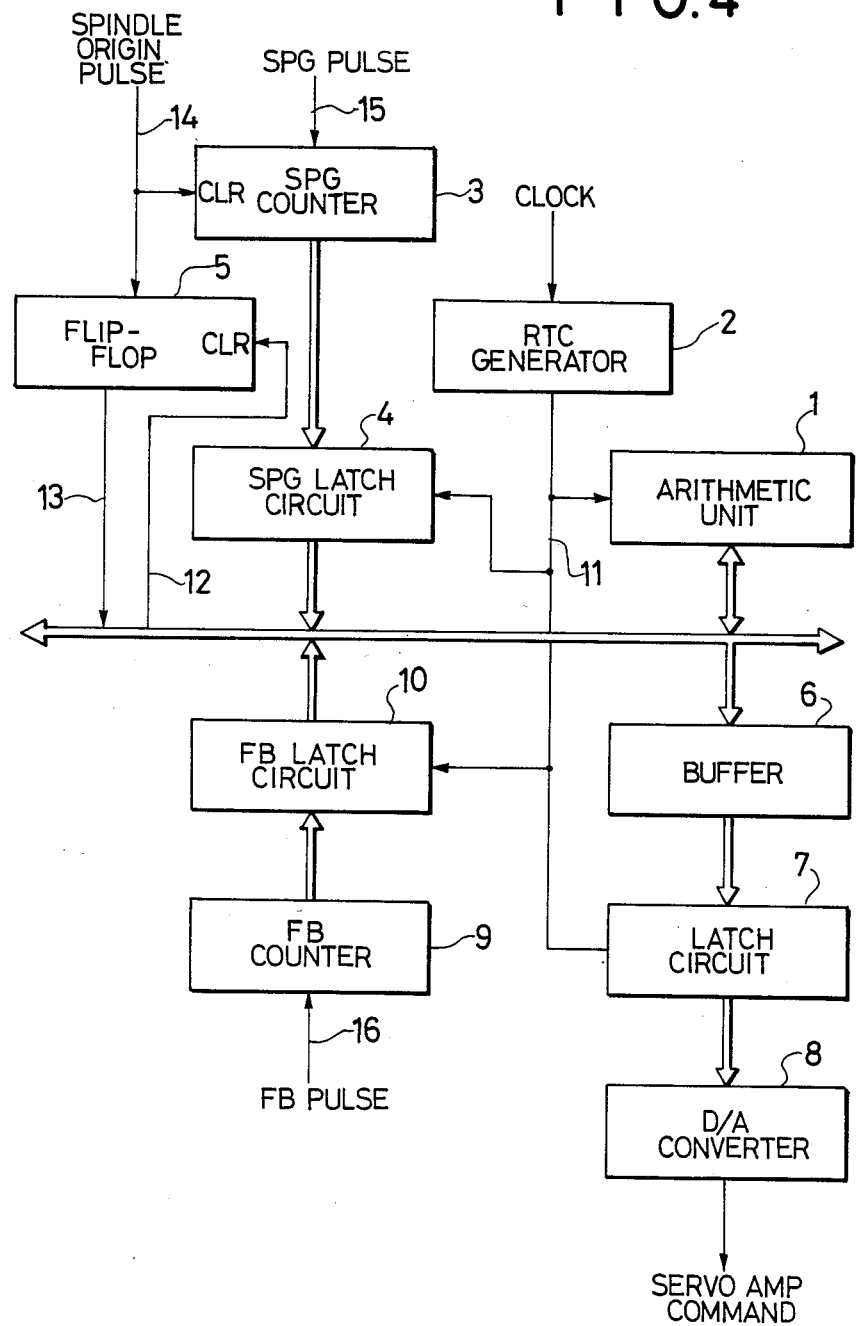
FIG. 4 is a block diagram showing an embodiment of a thread cutting control system according to the present invention.

FIG. 4 is a block diagram showing an embodiment of a thread cutting control system of the invention. FIG. 5 is a time chart for real time clocks (hereinafter abbreviated to RTC) 11, spindle origin pulses and arithmetic operations of a CPU.

In the software servo system, the feed shaft is controlled by the sampling of data. In this case, the RTC 11 are generated from an RTC generator 2 as the sampling clocks. An arithmetic unit 1 includes the CPU, a read only memory (ROM), a random access memory (RAM), and the like. The CPU uses the RTC 11 as an interruption signal and executes the arithmetic operations for the control by the interrupting process. FIG. 5 shows a state of the control for the operations, in which the operations are executed for times $T_1, T_2, \ldots$ for RTCs $11_1, 11_2, \ldots$, respectively.

The operations for the control of the feed system are mainly classified into the portion for production of command data (e.g., to generate a driving speed and other functions) and the portion for the position loop control.

(Production of command data)

As previously described above, the feeding operations of the shaft include the two kinds of mm/min and mm/rev. In the case of the feeding operation of mm/min, since the feed speed per time is predetermined, it is sufficient to convert the feed speed into the amount of movement again for every time $T_s$. In the case of the feeding operation of mm/rev, on the other hand, the shaft is fed on the basis of the ratio with the rotational speed of the spindle; therefore, the speed of the main shaft (spindle) needs to be known. For this purpose, an SPG counter 3 and SPG latch circuit 4 are provided. The SPG latch circuit 4 latches the count value of the SPG counter 3 at the timing of the RTC 11. The CPU reads out the latched value and takes out the increased amount from the data read at the timing of the preceding RTC 11, thereby enabling the spindle speed to be accurately measured. By multiplying the value designated by mm/rev (actually, the feed amount per unit spindle speed) to the resultant spindle speed (rotational amount of the spindle per time $T_s$), the feed amount per time $T_s$ can be obtained. Practically speaking, the calculations of the locus command such as biaxial simultaneous interpolation are also performed by the arithmetic unit 1. However, since they are not directly concerned with the present invention, their descriptions are omitted in this specification.

(Position loop control)

The difference between the value which is derived by summing up the command data (feed amount per time $T_s$) (hereinafter this value is referred to as command position data) and the position (FB position) to which the motor has actually rotated is calculated. The data proportional to the value of the difference is supplied to a D/A converter 8 as a command to the servo amplifier. The FB position is obtained in the following manner. First, FB pulses (generated from a pulse generator and or the like) 16 of the feed system are counted by an FB counter 9 as an up/down counter which counts up or down in accordance with the forward rotation or backward rotation of the shaft. The count value of the FB counter 9 is latched into an FB latch circuit 10 at the timing of the RTC 11. Thereafter, the CPU takes out the increased amount from the data of the FB latch circuit 10 at the timing of the preceding RTC 11, so that it is possible to know the rotational amount of the motor for the time interval from the preceding RTC 11 until the present RTC 11. Further, by summing up the rotational amount data, the FB position can be obtained. As described above, the resultant data of the arithmetic operation of the position loop control by the CPU is once set into a buffer 6. This data is latched into a latch circuit 7 at the timing of the next RTC 11 and inputted to the D/A converter 8. A flip-flop 5 is also provided to detect the origin of the spindle. When a spindle origin detection pulse 14 is detected, the output of the flip-flop 5 becomes a high level.

Figure 6:
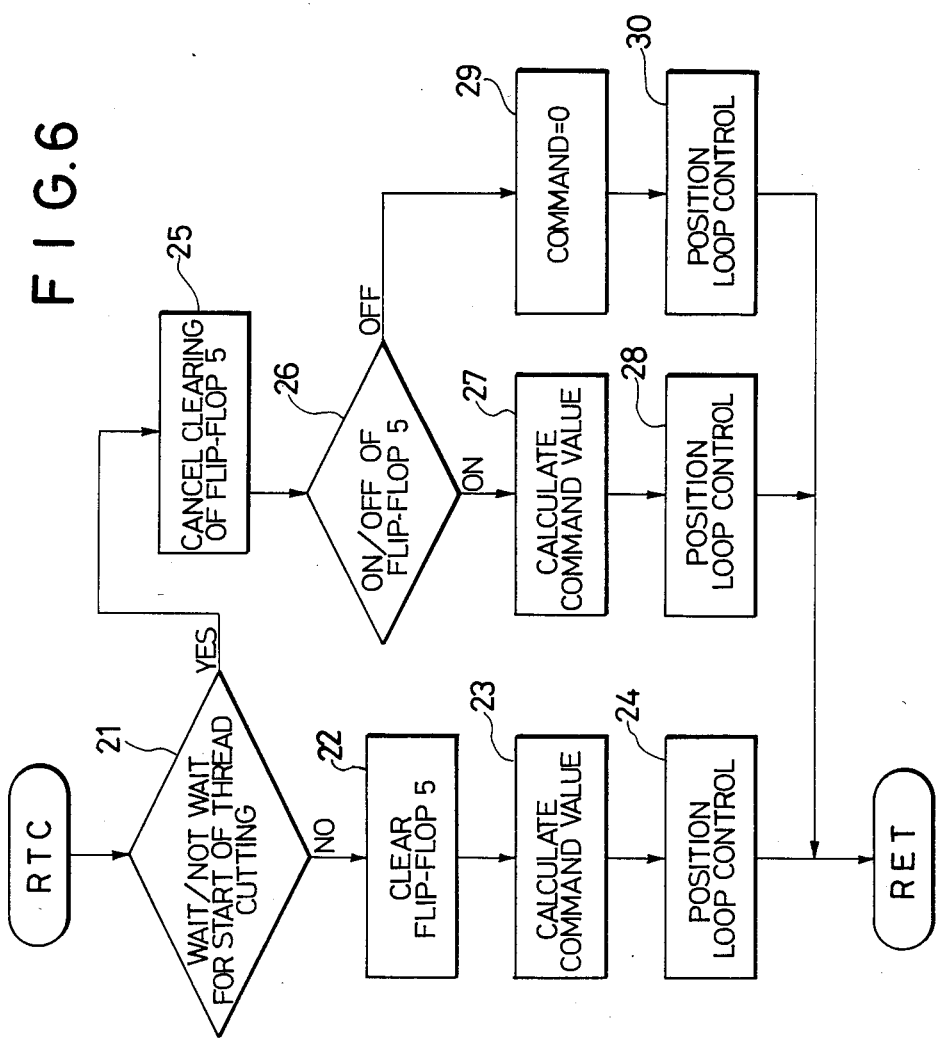
FIG. 6 is a flowchart for the arithmetic operating processes in the embodiment of FIG. 4.

FIG. 6 is a flowchart showing the flow of the operating processes in the embodiment.

Steps 21→22→23→24 are the ordinary processes which are executed at the timings of the RTC 11 in the operations other than the thread cutting work or during the thread cutting work after the thread cutting operation is started. Practically speaking, the flip-flop 5 is forcedly cleared (step 22). The command value is calculated (refer to the content previously described in the item of (Production of command data)) (step 23). Then, the position loop control is performed (refer to the content previously described in the item of (Position loop control)) (step 24).

Step 21→25→26→29→30 are the processes in the state of waiting for the start of the thread cutting work. When the spindle origin pulse is generated, the clearing of the flip-flop 5 is cancelled to detect the generation of this pulse and the flip-flop 5 is enabled (step 25). In this case, since the driving of the feed shaft must be stopped in the state of waiting for the start of the thread cutting work, the feed command is set to 0, i.e., into the servo lock state (step 29). Finally, the position loop control is executed (step 30) similarly to step 24. The above steps are repeated until the spindle origin pulse is generated.

Steps 21→25→26→27→28 are the processes just after the spindle origin pulse is generated, i.e., when the thread cutting work is started. The calculation of the command value (step 27) is slightly different from that in step 23. In the calculation in step 23, the speed of the spindle is the increased value from the preceding RTC 11. However, in step 27, the spindle speed is the amount of movement ($S_1$ in FIG. 10) from the spindle origin to the RTC 11. The other processes are substantially the same as described before. The position loop control (step 28) is the same as in step 24 or 30.

Figure 10:
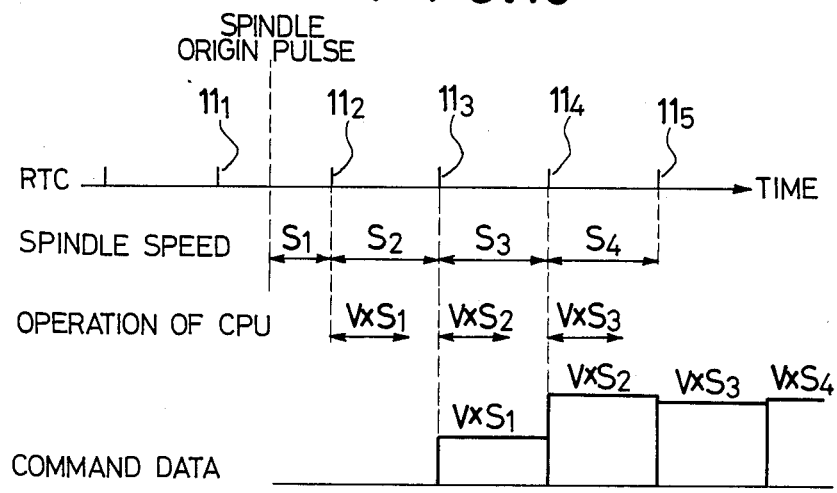
FIGS. 10 and 11 are time charts showing examples of the generation of a feed command in the invention.

As described above, the feed system is controlled by sampling, the RTC 11 by the command data as shown in FIG. 10.

The operation of the thread cutting control system of the present invention will now be described hereinbelow.

FIG. 7 is a diagram showing the thread cutting operation with the air-cut portion. This diagram illustrates the relative motions 65→66→67→68 of a cutter 61 and the work piece 62 which is rotated by the spindle in the case of performing the thread cutting work. In FIG. 7, 63 denotes an air-cut portion where the cutting work is not actually performed. The portion 64 is actually cut. The servo system of the feed shaft is, in general, the delay system which is determined by the position loop gain $k_p$ and it takes time to accelerate the feed system to the designated speed. Therefore, an acceleration distance longer than a predetermined distance is needed without fail to perform the thread cutting work with a high degree of accuracy. Now, assuming that the acceleration distance is L, this distance is equal to the distance of the air-cut portion 63. As described above, in the thread cutting work, in the portion 64 where the cutter 61 cuts the work piece 62, a constant relation must be always held between the rotation of the spindle and the movement of the feed system (the constant relation must also be obviously held between the rotational speed of the spindle and the driving speed of the feed system). Since the feed system certainly starts moving synchronously with the RTC without fail, the position (rotational angle) of the spindle at that time is not constant. To solve this problem, it is sufficient that while the feed system moves the acceleration distance L, the acceleration state of the feed system is properly controlled in such a manner that the relative positions of the spindle and feed shaft are held constant with respect to the rotation of the spindle.

FIG. 8 is a graph showing the acceleration state in the thread cutting work and other operations. Time $t_0$ denotes the timing of the RTC when the thread cutting work is started. $\tau_1$, $\tau_2$, and $\tau_3$ indicate the time deviations between the RTC and the time points when the spindle origin pulses are generated. $f_1$, $f_2$, and $f_3$ denote the speed curves of the feed system and correspond to the time deviations $\tau_1$, $\tau_2$, and $\tau_3$ between the spindle origin pulses and the RTC, respectively. $t_1$, $t_2$ and $t_3$ represent the times until the movement distance of the feed system becomes the air-cut distance L in the cases of the speed curves $f_1$, $f_2$, and $f_3$, respectively. The following equations are satisfied by these parameters:

$$L = \int_0^{t_1} f_1(t)dt = \int_0^{t_2} f_2(t)dt = \int_0^{t_3} f_3(t)dt \quad (1)$$

In addition, the speeds of the feed system in those three cases need to be equal. Therefore, $$V = f_1(t_1) = f_2(t_2) = f_3(t_3) \quad (2)$$

(where V is the feed speed during the thread cutting work)

It will be appreciated from equations (1) and (2) that the thread cutting work can be performed with a high degree of accuracy by properly selecting the speed curve f such that equations (1) and (2) are satisfied for the time deviation $\tau$ between the spindle origin and the RTC to start the thread cutting work.

The case where the time is used as the reference has been described above. In the case where the spindle position S is used as the reference, the foregoing description will be shown in the graph in FIG. 9. In this case, the spindle position S is the summed value of the spindle FB pulses from the spindle origin when the thread cutting work is started. $S_0$ denotes the position of the spindle (i.e., work piece) to start the thread cutting work. $S_1$, $S_2$, and $S_3$ denote the spindle positions when the feed shaft is started by the RTC after the generation of the spindle origin data. The values of $S_1$ to $S_3$ are variable. It is sufficient to select the functions $g_1$, $g_2$, and $g_3$ for generation of the feed command so that the following equations are satisfied for the values of $S_1$ to $S_3$.

$$L = \int_{S_1}^{S_0} g_1(S)ds = \int_{S_2}^{S_0} g_2(S)ds = \int_{S_3}^{S_0} g_3(S)ds \quad (3)$$

$$V = g_1(S_0) = g_2(S_0) = g_3(S_0) \quad (4)$$

FIG. 10 shows the simplest example of the feed command function g for the spindle speed S as to satisfy equations (3) and (4). In the diagram, $11_1$, $11_2$, ..., $11_5$ denote the RTC. In this example, the spindle origin pulse is generated between the RTC $11_1$ and $11_2$. $S_1$ to $S_4$ indicate the rotational amounts of the spindle for a constant time between the RTC (the unit is the spindle FB pulse) and denote the spindle speeds. $S_2$, $S_3$, . . . represent the rotational amounts of the spindle for one period of the RTC. Only $S_1$ indicates the spindle rotational amount for the interval from the spindle origin until the RTC. V is the speed of the feed shaft per unit spindle speed, and the result of the multiplication of $V \times S$ by the CPU is used as the feed command. In other words, the function in which the designation data varies in a stepwise manner for every RTC such that $V \times S_1 \rightarrow V \times S_2 \rightarrow V \times S_3 \rightarrow$ . . . is nothing but the function g. This point will be simply proved hereinbelow.

Assuming that the predetermined spindle position $S_0$ (to be cut) comes during the command of $V \times S_4$, $$S_0 = S_1 + S_2 + S_3 + \delta \cdot S_4 \quad (5)$$

(where $\delta$ denotes that the spindle position $S_0$ comes during the command of $V \times S_4$ and $\delta$ is a value within a range of 0 to 1)

At this time, an amount l of movement of the feed system is $$\begin{aligned} l &= V \times S_1 + V \times S_2 + V \times S_3 + V \times \delta \times S_4 \\ &= V \times S_0 \end{aligned}$$

In other words, the movement amount l is constant for the spindle position $S_0$. On the other hand, since the feed command is $V \times S_i$, a constant ratio is held between the feed speed of the feed system and the rotational speed of the spindle.

Figure 11:
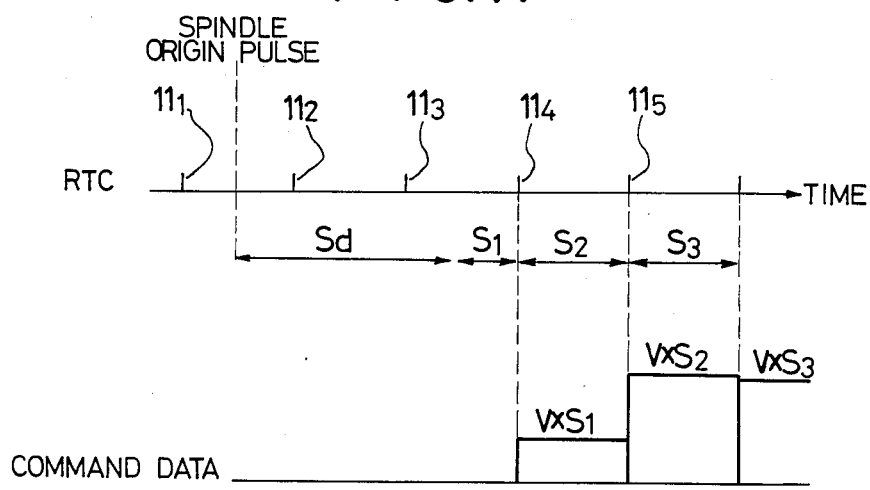

As shown in FIG. 11, it is also possible to start the thread cutting work by purposely shifting from the spindle origin by a predetermined amount predetermined angle). In this case, the CPU detects the spindle position $S_{RTC}$ in the process of the RTC. When this distance becomes $S_d$ or more, the CPU sets $S_1$ to $S_{RTC} - S_d$ and performs the control similar to the above. This means that the leads of another thread can be further cut from the position which is shifted by an arbitrary angle from the lead of one thread (the lead of the screw which has already been threaded). Therefore, this method can be applied to the cutting of multiple threads and other operations.

As described above, according to the present invention, when the thread cutting work is performed by the NC apparatus in which the RTC which are generated at regular time intervals are used as the sampling clocks, the spindle (or work piece) which rotates asynchronously with the RTC is always cut from the constant spindle position (work piece position). At the same time, the feed system is controlled at the feed speed of the constant ratio with the rotational speed of the spindle. Thus, the effect is that the feed system can be controlled so as to cut the thread lead with a high degree of accuracy.

The present invention is not limited to the foregoing embodiments but many modifications and variations are possible within the spirit and scope for the appended claims of the invention.

What is claimed is:

1. A thread cutting control method in an NC apparatus having a CPU in an arithmetic unit, whereby real time clocks which are generated for every constant time are received as an interruption signal and a sampling operation is performed in response to said interruption signal, thereby controlling a feed system of a machine tool having a thread cutting function, said control method comprising the steps of:
measuring the rotational speed of a spindle which is rotating asynchronously with said real time clocks;
measuring the rotational amount of the spindle from a predetermined position on the rotational position of the spindle until the real time clock is just generated; and
generating a feed command to command the feed system, after the feed system has moved a predetermined distance from a predetermined position, such that the distance the feed system moves is constant to the position of the spindle and a predetermined ratio is held between the feed speed of the feed system and the rotational speed of the spindle.

2. A thread cutting control method according to claim 1, wherein the rotational amount and the rotational speed of said spindle are measured by counting feedback pulses which are generated from a pulse generator attached to a rotary shaft of the spindle or work piece.

3. A thread cutting control method according to claim 1, wherein said rotational amount is multiplied with a certain constant for only the sampling period when the thread cutting work is started, and said rotational speed is multiplied with said constant for the sampling periods after the start of the thread cutting work, thereby allowing a desired feed speed to be generated.

4. A thread cutting control method according to claim 1, wherein a predetermined value is subtracted from said rotational amount, and the rotational amount is reset to the result of the subtraction, thereby enabling a second thread to be cut displaced from a first thread and allowing a desired feed speed to be generated.

* * * * *